Jan. 13, 1942.        A. P. PETWAY         2,270,139
                        DISPENSER
                    Filed Nov. 7, 1939
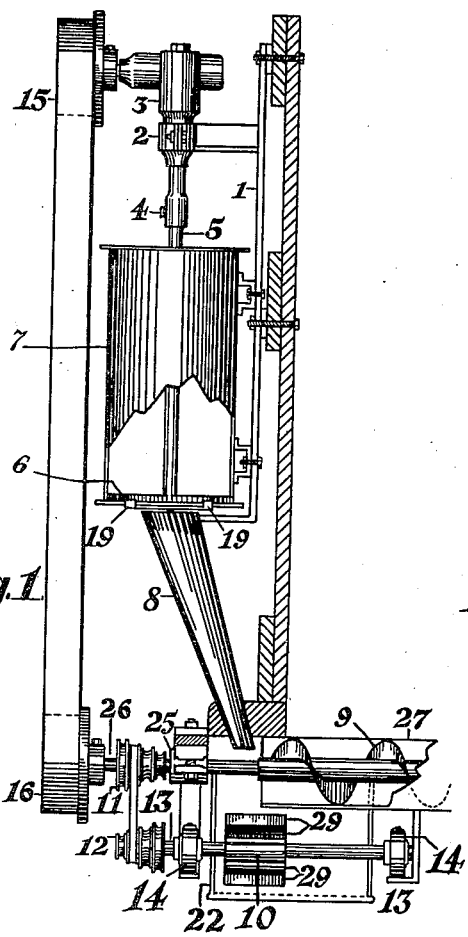
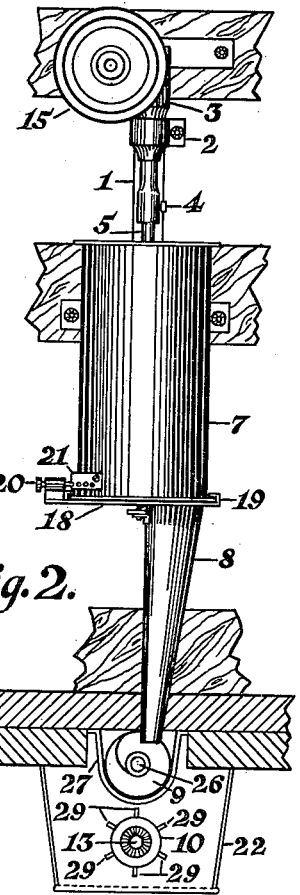
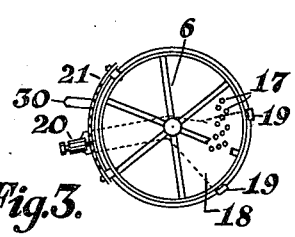
INVENTOR
Alphonso Paul Petway Patented Jan. 13, 1942

2,270,139

UNITED STATES PATENT OFFICE 2,270,139

DISPENSER

Alphonso Paul Petway, Waco, Tex.

Application November 7, 1939, Serial No. 303,170

1 Claim. (Cl. 221—144)

The invention relates to new and useful improvements in processing planting seed with dust disinfectants and has for an object a positive means for feeding a predetermined amount of dust to the seed for treatment.

Another object is to thoroughly coat or cover each individual seed with dust while being treated.

The invention may be more readily understood by referring to the accompanying drawing in which Fig. 1 is a side view of the complete machine partly shown in section. Figure 2 is a front and sectional view of same with pulleys 16, 11 and 12, and bearings 25 and 14 removed. Figure 3 is a plan or top view of the dust container with the right angle drive removed to more clearly show the interior. Figure 4 is a plan of the cut off slide beneath the dust container also showing an arc having spaced holes for holding the slide in the desired position by means of a plunger. Figure 5 is a front view of the arc shown in Figure 4. Figure 6 is a side view of a modified slide using a spring clip instead of a plunger as shown in Figure 4. Figures 7 and 8 are modifications of Figure 5. Figures 9 and 11 are plan or top views of a modified form of the mixing cylinder as shown at 10 (Figs. 1 and 2) and Figures 10 and 12 are side views of 9 and 11 respectively.

In the drawing like numerals designate like parts. 1 is a supporting bracket (see Figs. 1 and 2) for attaching the machine securely in place. 2 is a clamp for supporting right angle drive 3 in desired position. 4 is a set screw for securing shaft 5 to right angle drive 3. The right angle drive may be removed when desired by releasing set screw 4 and opening clamp 2. In the accompanying drawing the machine is shown attached to a wall of a seed cleaning or culling machine with no part of the culling machine shown except the discharge end of a screw conveyor 9 in a trough 27. This conveyor shows one method of discharging the seed into an enclosed box 22, the seed falling by gravity onto a rotating cylinder 10 that has spaced cross bars or barriers 29 extending outwardly upon the periphery of the cylinder, the purpose of which is to use centrifugal action to separate the seed one from another.

The disinfectant dust is placed in the container 7 and through means of the rotating agitator 6 in proximity to the bottom of the container will constantly move the dust over the spaced holes through said bottom and to one side of the center of same. Beneath the holes through the bottom of the container is a pivotally mounted slide or closure member 18 (Figures 3 and 4) extending substantially diametrically across the bottom of the container, on one side of same are lips 19 bent to conform to the protruding edges of the bottom of the container for the purpose of holding the slide in nearness thereto preventing undesired leakage. Attached to the opposite side of the slide 18 is shown a plunger 20 working in conjunction with an arc 21 attached to the container 7 and having holes 30 spaced apart in relation to the holes or discharge openings 17 through the bottom of said container. By moving the plunger from one hole of the arc 21 to another a like number of holes in the bottom of the container will be opened or closed. This will provide means for feeding the desired quantity of dust through the holes in the container which will gravitate through the spout 8 into the enclosed box 22 and also fall upon the rotating cylinder 10 with the seed, thereby creating a fog of the dust through which the seed are thrown and fall by gravity thus assuring a thorough coating of the seed with the disinfectant dust.

Motion is given the various parts by revolving the conveyor 9 (see Fig. 1) as may be done through the use of a pulley on the opposite end of shaft 28 and belted to any suitable source not shown. Then belt around pulleys 16 and 15 will drive the vertical shaft 5 through means of the right angle drive 3, this will give motion to the agitator 6. A variation in the speed of the mixing cylinder 10 may be had through the use of a belt surrounding the step pulleys 11 and 12 mounted on shafts 26 and 13 respectively.

In the modified forms of the cut off slide (Fig. 6) 28 is an upturned portion standing at substantially right angle to the plane of the slide and may be used in conjunction with the arc shown in Figure 7, 31 being ribs or raised portions across the face and spaced as described in 21 (Fig. 5). Figure 8 is a similar arc except notches 32 are used instead of raised portions 31 (Fig. 7) or the holes 30 (Fig 5). In using the modifications a slight downward pressure exerted upon the cut off slide as at 28 (Fig. 6) will disengage it from the notches 32 (Fig. 8) or the cross members 31 (Fig. 7) and permit movement of the said slide to any desired position, upon releasing the said downward pressure the slide will spring into engagement with said notches in the said arc.

Figure 9 is a plan of a cone in modified form of the mixing cylinder 10 (Fig. 2) having spaced raised portions or barriers 23 which are more clearly shown in the elevation (Fig. 10). Figure 11 is another plan of a modification of the mixing cylinder 10, in this drawing is shown a disk with radially spaced barriers 24 thereupon and has for a purpose the preferred form as shown at 10 (Figs. 1 and 2).

What I claim is:

In a machine of the character described, a dust container, said container having discharge openings, a closure member rotatably mounted at the bottom of the container and having a portion adapted to normally close said openings, the container having a rim at the bottom thereof, lips carried by the closure member and overhanging the rim for retaining the closure member in a position to rotate with respect to the bottom of the container, coacting locking means carried by the closure member and container for locking the closure member in a selected position whereby the discharge openings may be selectively fully opened as well as varied to control the amount of discharge from the discharge openings, the container constituting one member and the closure member constituting a second member, the coacting locking means comprising an apertured arc-shaped element carried by one member and a releasable plunger carried by the other member for engaging the apertured arc-shaped element.

ALPHONSO PAUL PETWAY.